United States Patent [19]

Volmerange

[11] 3,710,140

[45] Jan. 9, 1973

[54] FLIP-FLOP AND HOLD PHASE DETECTOR

[75] Inventor: Hubert Marie Volmerange, Woodland Hills, Calif.

[73] Assignee: RCA Corporation

[22] Filed: Nov. 9, 1970

[21] Appl. No.: 87,990

[52] U.S. Cl. ..................328/133, 307/215, 307/232, 307/291

[51] Int. Cl. ..........................H03b 3/04, H03d 13/00

[58] Field of Search ......307/232, 291, 215; 328/133, 328/134; 324/186

[56] References Cited

UNITED STATES PATENTS

| | | | |
|---|---|---|---|
| 3,005,165 | 10/1961 | Lenigan | 328/133 X |
| 3,354,455 | 11/1967 | Briggs et al. | 324/186 X |
| 3,430,148 | 2/1969 | Miki | 328/133 |
| 3,626,307 | 12/1971 | Koyama | 307/233 X |
| 2,708,718 | 5/1955 | Weiss | 328/134 |
| 3,265,976 | 8/1966 | Broadhead | 328/134 X |
| 3,386,041 | 5/1968 | Bell | 307/232 X |
| 3,537,018 | 10/1970 | Modiano | 328/133 |

*Primary Examiner*—John S. Heyman
*Attorney*—Edward J. Norton

[57] ABSTRACT

A phase comparator wherein the charging or discharging of a charge storage device is determined by the phase or time difference between first and second pulse signals.

5 Claims, 2 Drawing Figures

FLIP-FLOP AND HOLD PHASE DETECTOR

BACKGROUND OF THE INVENTION

This invention relates to circuitry for determining phase or time differences between first and second pulse signals.

Phase detectors and comparators found in phase-locked loops of digital frequency synthesizers operate by *a voltage current that is proportional to the phase of timing of the leading or trailing edge of one pulse (normally called the "N" pulse) with respect to the leading or trailing edge of a reference pulse (normally called the "N" pulse). The repetition rate common to the R and N pulses is called the sampling frequency. A low ripple voltage or current at the output of the comparator at the sampling frequency is generally required, since the output of the phase detector controls the frequency of a voltage controlled oscillator and the output of the voltage controlled oscillator will not be at a desired constant frequency but will fluctuate in accordance with the undesired ripple frequency components of the output of the comparator.*

In one prior art phase detector, known as the "sample and hold" type, ripple is inherently generated during the sampling period. In addition, since large voltages and currents must be switched, unwanted transients are also generated. The ripple and transients must be attenuated by an integrating filter which causes an unwanted delay of the signal transmitted from the phase detector to the voltage controlled oscillator.

Other disadvantages of prior art phase detectors are:

i. they cannot be operated at high sampling frequencies because analog circuitry is used to process the signals;

ii. adaptation to miniaturization by integrated circuit techniques is difficult; and iii. spurious frequencies are generated due to transient effects.

An object of this invention is to provide a phase comparator the output of which is substantially free from ripple and spurious frequencies, which is operable at high sampling frequencies and which is compatible with integrated circuit techniques.

SUMMARY

The circuit herein described includes a first current source which is rendered conductive in response to a first signal, and a second current source which is rendered conductive in response to a second signal. The first and second current sources, when conductive, provide equal values of current. Charge storing means are coupled to the first and second current sources. The charge storing means accumulates charge when only the first current source is conducting. The charge storing means loses charge when only the second current source is conducting and the charge storing means remains charged at a fixed level when both the first and second current sources are conducting.

IN THE DRAWINGS

a. the N and R pulses are in phase, b. the N pulse leads the R pulse, and c. the N pulse lags the R pulse.

Figure 1:
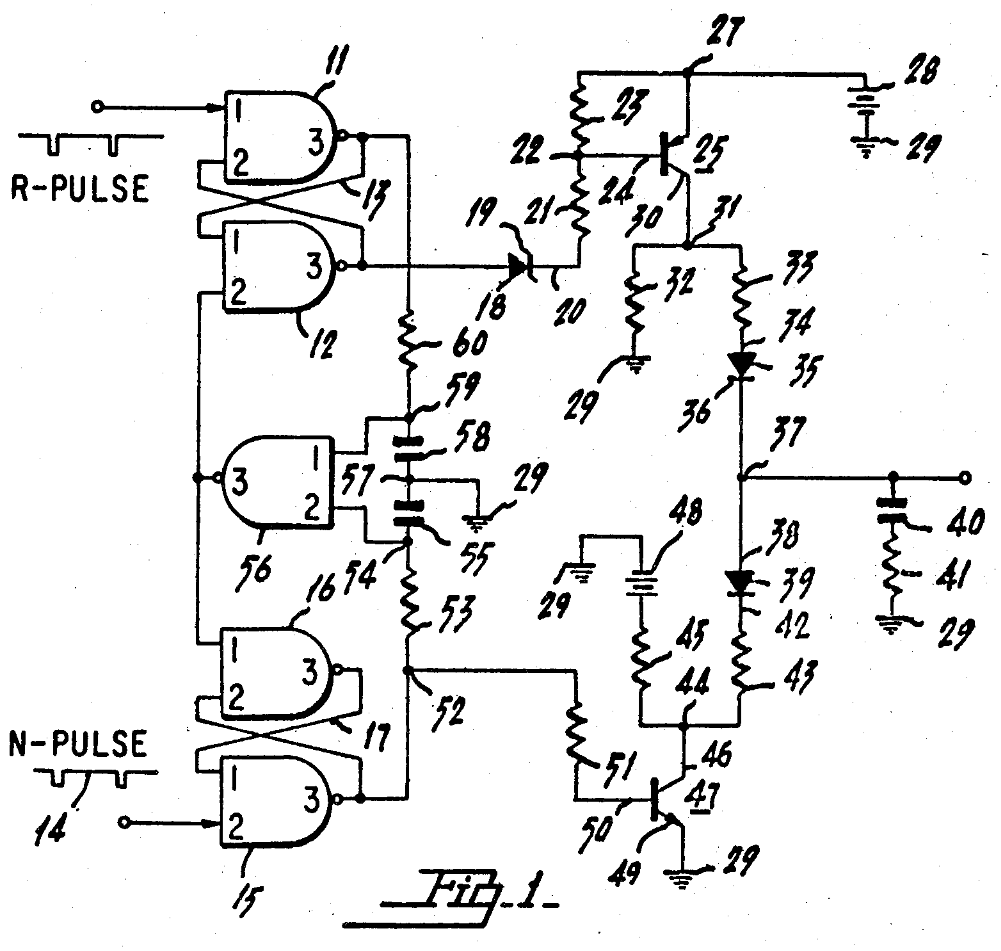
FIG. 1 is a circuit diagram of a phase comparator according to an embodiment of the invention.

As shown in FIG. 1, NAND gates 11, 12, 15, 16 and 56 are provided, each having two input terminals 1 and 2 and an output terminal 3. NAND gates 11 and 12 and NAND gates 15 and 16 are cross-coupled to form bistable multivibrators 13 and 17.

A series of pulses (R pulses) of constant repetition rate is coupled to input terminal 1 of NAND gate 11. The output terminal 3 of NAND gate 11 is connected to input terminal 1 of NAND gate 12. The output terminal 3 of NAND gate 12 is connected to input terminal 2 of NAND gate 11; interconnected NAND gates 11 and 12 comprise bistable multivibrator 13.

Similarly, a series of pulses (N pulses) of constant repetition rate is coupled to input terminal 2 of NAND gate 15. The output terminal 3 of NAND gate 15 is connected to input terminal 2 of NAND gate 16. The output terminal 3 of NAND gate 16 is connected to input terminal 1 of NAND gate 15; interconnected NAND gates 15 and 16 comprise bistable multivibrator 17.

Output terminal 3 of NAND gate 12 is connected to the anode 18 of a zener diode 19. The cathode 20 of zener diode 19 is connected to one terminal of current limiting resistor 21. The other terminal of current limiting resistor 21 is connected to the junction 22 formed by one terminal of base return resistor 23 and the base electrode 24 of PNP transistor 25. The emitter electrode 26 of transistor 25 is connected to the junction 27 formed by the intersection of the other terminal of base return resistor 23 and the positive terminal of a source of dc voltage 28. The negative terminal of the dc voltage source 28 is connected to a point of reference potential 29.

Collector 30 of transistor 25 is connected to the junction 31 formed by one terminal of resistor 32 and one terminal of resistor 33. The other terminal of resistor 32 is connected to the point of reference potential 29. The other terminal of resistor 33 is connected to the anode 34 of diode 35. The cathode 36 of diode 35 is connected to the junction 37 formed by the anode 38 of diode 39 and one terminal of a capacitor 40. The other terminal of capacitor 40 is connected to phase shifting resistor 41. The other terminal of resistor 41 is connected to the point of reference potential 29.

Cathode 42 of diode 39 is connected to one terminal of resistor 43. The other terminal of resistor 43 is connected to the junction 44 formed by one terminal of resistor 45 and the collector electrode 46 of NPN transistor 47. The other terminal of resistor 45 is connected to the positive terminal of a source of dc voltage 48. The negative terminal of dc voltage source 48 is connected to a point of reference potential 29. The emitter electrode 49 of transistor 47 is connected to a point of reference potential 29. The base electrode of transistor 47 is connected to one terminal of current limiting resistor 51.

The other terminal of resistor 51 is connected to the junction 52 formed by the output terminal 3 of NAND gate 15 and one terminal of resistor 53. The other terminal of resistor 53 is connected to the junction 54 formed by one terminal of a capacitor 55 and input terminal 2 of NAND gate 56. The other terminal of capacitor 55 is connected to the junction 57 formed by the point of reference potential 29 and one terminal of a capacitor 58. The other terminal of capacitor 58 is connected to the junction 58 formed by input terminal 1 of NAND gate 56 and one terminal of resistor 60. The other terminal of resistor 60 is connected to the output terminal 3 of NAND gate 11. The input terminal 2 of NAND gate 12 is connected to the junction formed by the output terminal 3 of NAND gate 56 and the input terminal 1 of NAND gate 16.

Figure 2:
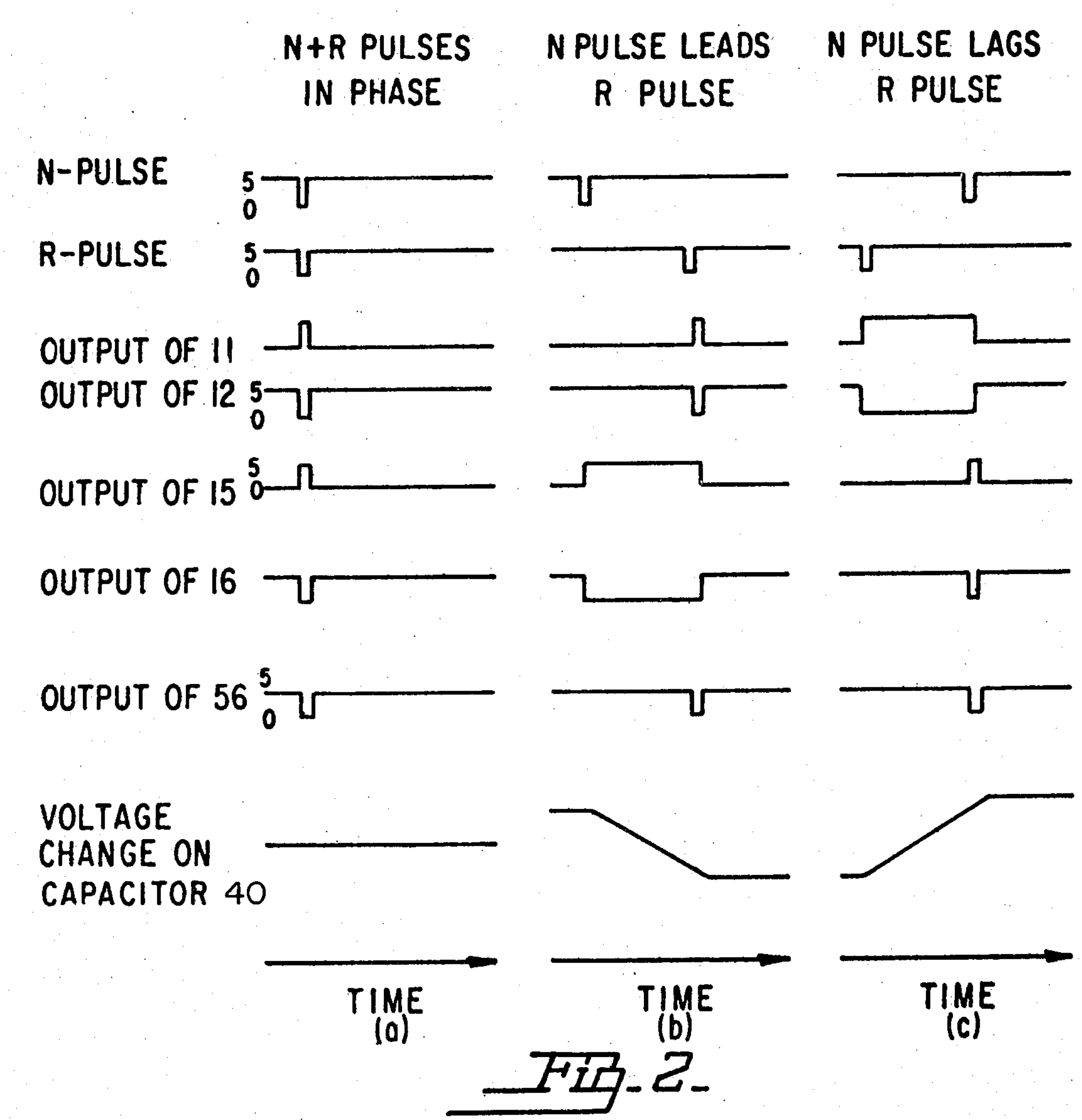
FIG. 2 shows waveforms of the signals appearing at several points in the circuit when.

An analysis of the signals at various portion of the circuit of FIG. 1, shown in FIG. 2, will clarify the operation of the disclosed invention. When a negative R pulse is applied to input terminal 1 of NAND gate 11, NAND gate 11 changes state resulting in a positive dc level at output terminal 3. Output terminal 3 of gate 11 is coupled to input terminal 1 of NAND gate 12, and the positive dc signal at input terminal 1 of gate 12 will cause gate 12 to change state resulting in a negative dc level at output terminal 3 of gate 12. Output terminal 3 is also coupled to input terminal 1 of gate 56, through the delay network consisting of resistor 60 and capacitor 58, so that a positive signal appears at input terminal 1 of gate 56. In the embodiment shown in FIG. 1, the voltages corresponding to the positive and "negative" states of NAND gates 11, 12, 15, 16 and 56 are 5 volts and 0 volts respectively.

The function of zener diode 19 is to shift the dc voltage across the base-emitter junction of transistor 25 so that transistor 25 will conduct only when a negative dc level is present at the output of multivibrator 13. In FIG. 1, transistors 25 and 47 operate as switching transistors. When transistor 25 conducts, the voltage at collector electrode 30 approaches the dc bias voltage 28 and current flows toward junction 31 and through forward biased diode 35. Assume that at the time the R pulse causes multivibrator 13 to change state, an N pulse is not present at input terminal 2 of NAND gate 15, i.e., the R pulse leads the N pulse. In this case, the waveforms corresponding to which are shown in FIG. 2*c*, output terminal 3 of NAND gate 15 will be at 0 volts and transistor 47 will not conduct. Diode 39 will thus be reverse biased by battery 48, so that only a very small leakage current will flow through diode 39, while the conduction current flowing through forward biased diode 35 will charge capacitor 40. The charge, Q, on capacitor 40 is given by $$Q = Q_0(1 - e^{-t/R_{41}C_{40}})$$

where $Q_0 \sim V_{dc} \times C_{40}$ and the rate of charge will be approximately linear for a time difference between the occurrence of the R pulse and N pulse much less than the charging time constant defined by the product of $R_{41}C_{40}$, i.e., $t\phi_{RN} << R_{41}C_{40}$.

Capacitor 40 will continue to charge to a maximum value of $V_{dc} \times C_{40}$ so long as an N pulse has not triggered NAND gate 15. Upon the arrival of an N pulse at terminal 2 of NAND gate 15, NAND gate 15 changes state, so that a positive voltage level appears at the input terminal 2 of gate 56, causing output terminal 3 of NAND gate 56 to change to its negative state causing NAND gates 12 and 16 to change state which in turn resets NAND gates 11 and 15, with the result that the transistor 25 becomes non-conducting and capacitor 40 ceases to charge.

Resistors 53 and 60 in association with capacitors 55 and 58 constitute delay networks which delay the occurrence of reset conditions in the circuit so that the gates have time to clear and settle down before the next switching.

For the condition where the N pulse leads the R pulse, shown in FIG. 2*b*, gate 15 will change state upon occurrence of the N pulse, resulting in a positive dc level at output terminal 3. The emitter-base junction of transistor 47 will be positively biased, causing transistor 47 to become conductive whereby the voltage at collector 46 approaches the point of reference potential.

Assuming that capacitor 40 is charged to a value $Q_1$ from a previous pair of pulses, capacitor 40 will begin to discharge through forward biased diode 39. The change on capacitor 40 will decrease with time according to the relation, $Q = Q_1\, e^{-t/R_{41}C_{40}}$. The rate of discharge will be approximately linear for a time difference between the N and R pulses that is much less than the product of $R_{41}C_{40}$, i.e., $T\phi_{NR} << R_{41}C_{40}$. In the circuit shown in FIG. 1, the charging and discharging time constants are the same, and equal the product of $R_{41}C_{40}$. It should be noted that the impedance of the remainder of the charging and discharging circuits is small compared to the impedance of the charge storing circuit given by the series combination of $C_{40}$ and $R_{41}$. Capacitor 40 will continue to discharge until an R pulse causes gate 11 to change state. The positive pulse at output terminal 3 of gate 11 will appear at input terminal 1 of gate 56, causing output terminal 3 of gate 56 to change state to its negative state. The negative signal at output terminal 3 of gate 56 causes gates 12 and 15 to be reset with the result that transistor 47 becomes non-conductive and capacitor 40 ceases discharging.

For the case when the N pulse and R pulse are in phase, NAND gates 12 and 15 will both change state, causing transistors 25 and 47 to conduct. Current will begin to flow through diode 35, but this current will not go to charge capacitor 40 but will be diverted through forward biased diode 39. The charge on capacitor 40 will remain at the level existing prior to the arrival of the N pulse and R pulse. In addition the positive output of gate 11 will appear across terminal 1 of gate 56, while the positive output of gate 15 will appear at terminal 2 of gate 56. Gate 56 will change state and the negative output at terminal 3 will cause gates 12 and 15 to be reset, and transistors 35 and 47 to become non-conductive.

Circuit parameters associated with the circuit of FIG. 1, by way of example and can include the following:

| | | |
|---|---|---|
| Capacitors | 40 | 1μF |
| | 55 | 330pF |
| | 58 | 330pF |
| Resistors | 21 | 1KΩ |
| | 23 | 4.7KΩ |
| | 32 | 470Ω |
| | 33 | 4.7KΩ |
| | 41 | 47KΩ |
| | 43 | 4.7KΩ |
| | 45 | 470Ω |
| | 51 | 10KΩ |
| | 53 | 1KΩ |
| | 60 | 1KΩ |
| Zener Diode | 19 | 1N5230B–4.5 volts |
| Transistors | 25 | 2N4125 |
| | 47 | 2N4123 |
| Diodes | 35 | 1N457A |
| | 39 | 1N457A |
| Voltage Source | 28 | 9.5 volts |
| | 48 | 9.5 volts |
| NAND gates | 11, 12, 15, 16 | Signetics S8880A integrated circuit operated between 5 volts and ground |
| | 56 | one-fourth signetics S8880A |

integrated circuit operated between 5 volts and ground

What is claimed is:

1. A phase comparator comprising:

a first bistable multivibrator comprising first and second cross coupled NAND gates, said multivibrator changing state in response to a first pulse signal;

a second bistable multivibrator comprising third and fourth cross coupled NAND gates, said second multivibrator changing state in response to a second pulse signal;

a fifth NAND gate, having input terminals coupled to the first and fourth NAND gates and an output terminal coupled to the second and third NAND gates, said fifth NAND gate changing state when positive signals appear at its two input terminals, so that the signal appearing at its output terminal causes the second and third NAND gates to change state, whereby the first and second multivibrators return to their initial state;

first and second active elements each having first and second main electrodes and a control electrode;

a zener diode having first and second electrodes, the first electrode thereof being coupled to the output of the first multivibrator and the second electrode thereof being coupled to the control electrode of the first active element, wherein the active element will be rendered conducting when the first multivibrator has changed state in response to a pulse signal;

means for applying a first bias voltage between a point of reference potential and a first of said main electrodes of the first active element;

means for connecting the second main electrode of the first active element and the first main electrode of the second active element, said means including a junction point;

means for applying a second bias voltage between the point of reference potential and said first main electrode of the second active element;

the second of said main electrodes of the second active element being coupled to the point of reference potential; the control electrode of the second active element being coupled to the output terminal of the second multivibrator, so that when a pulse causes the second multivibrator to change state, the second active element begins to conduct; and a capacitive energy storage means connected between said junction point and said point of reference potential, said capacitive energy storage means storing charge when only the first active element is conducting, said capacitive energy storage means losing charge when only the second active element is conducting and said capacitive energy storage means being charged to a fixed level when both the first and second active elements are conducting.

2. A phase comparator according to claim 1 wherein said capacitive energy storage means has a predetermined time constant that is substantially greater than the time interval between said first pulse and said second pulse.

3. A phase comparator according to claim 1 wherein said junction point is formed by two series connected diodes having substantially matched volt-ampere characteristics.

4. A phase comparator according to claim 1 further comprising a first and second time delay network, respectively connected in circuit with the first and second input terminals of said fifth NAND gate.

5. A phase comparator, comprising:

a first bistable multivibrator comprising first and second cross coupled NAND gates, said multivibrator changing state in response to a first pulse signal;

a second bistable multivibrator comprising third and fourth cross coupled NAND gates, said second multivibrator changing state in response to a second pulse signal;

a fifth NAND gate, having input terminals coupled to the first and fourth NAND gates and an output terminal coupled to the second and third NAND gates, said fifth NAND gate changing state when positive signals appear at its two input terminals, so that the signal appearing at its output terminal causes the second and third NAND gates to change state, whereby the first and second multivibrators return to their initial state;

first and second active elements each having first and second main electrodes and a control electrode;

a zener diode having cathode and anode electrodes, the anode electrode being coupled to the output of the first multivibrator and the cathode electrode being coupled to the control electrode of the first active element, wherein the active element will be rendered conducting when the first multivibrator has changed state in response to a pulse signal;

means for applying a first bias voltage between a point of reference potential and a first of said main electrodes of the first active element;

first and second diodes each having cathode and anode electrodes;

the junction of the cathode electrode of the first diode and the anode electrode of the second diode defining a first junction;

the anode electrode of the first diode being coupled to the second of said main electrodes of the first active element, the cathode element of the first diode being coupled to the first junction, and the cathode electrode of the second diode being coupled to a first of said main electrodes of the second active element;

means for applying a second bias voltage between the point of reference potential and said first main electrode of the second active element;

the second of said main electrodes of the second active element being coupled to the point of reference potential, the control electrode of the second active element being coupled to the output terminal of the second multivibrator, so that when a pulse causes the second multivibrator to change state, the second active element begins to conduct; and a first capacitor having one terminal coupled to the first junction and a second terminal coupled to a current limiting resistor, said capacitor storing charge when only the first active element is conducting, said capacitor losing charge when only the second active element is conducting and said capacitor being charged to a fixed level when both the first and second active elements are conducting, the other terminal of the current limiting resistor being coupled to the point of reference potential.

* * * * *

UNITED STATES PATENT OFFICE
CERTIFICATE OF CORRECTION

Patent No. 3,710,140 Dated January 9, 1973

Inventor(s) Hubert Marie Volmerange

It is certified that error appears in the above-identified patent and that said Letters Patent are hereby corrected as shown below:

Column 1, line 9 "by a voltage current" should be -- by generating a voltage or current --

Column 1, line 9 "phase of timing" should be -- phase or timing --

Column 1, line 13 "N", first occurrence ,should read -- R --.

Signed and sealed this 3rd day of July 1973.

(SEAL)
Attest:

EDWARD M.FLETCHER,JR.
Attesting Officer

Rene Tegtmeyer
Acting Commissioner of Patents